United States Patent [19]
Putnam

[11] 3,750,322
[45] Aug. 7, 1973

[54] FISHING FLY WITH SNAGPROOF HOOK
[76] Inventor: Allen L. Putnam, 311 Santa Barbara Ave., Fullerton, Calif.
[22] Filed: May 22, 1972
[21] Appl. No.: 255,903

Related U.S. Application Data
[60] Continuation of Ser. No. 24,443, March 16, 1970, abandoned, which is a division of Ser. No. 704,657, Feb. 12, 1968, Pat. No. 3,500,574.

[52] U.S. Cl................ 43/42.25, 43/42.43, 43/43.4, 43/43.6
[51] Int. Cl...................... A01k 83/00, A01k 85/08
[58] Field of Search....................... 43/42.25, 42.42, 43/42.43, 43.4, 43.6, 42.1

[56] References Cited
UNITED STATES PATENTS
3,142,928   8/1964   Adams................................ 43/43.4
3,260,012   7/1966   Stolzer................................ 43/42.1

Primary Examiner—Louis G. Mancene
Assistant Examiner—Daniel J. Leach
Attorney—Laurence R. Brown

[57] ABSTRACT

A fishing fly comprising a hook having a shank, an eye and a bent shank portion ending in a barbed point, a fly body and head formed on the shank between the eye and the barbed point and an attaching means for a leader mounted between the head and the body forming a loop about the outer periphery of the bent shank portion to form a "Brush-Off" feature preventing snagging or fouling in weeds, etc.

1 Claim, 2 Drawing Figures

PATENTED AUG 7 1973

3,750,322

FISHING FLY WITH SNAGPROOF HOOK

This is a continuation of co-pending application, Ser. No. 24,443 filed Mar. 16, 1970, now abandoned, which is a division of application, Ser. No. 704,657 filed Feb. 12, 1968, now U.S. Pat. No. 3,500,574 issued Mar. 17, 1970.

This invention relates to fishing flies, lures and nymphs and the like and has basically for its object the production of a simple method of making lures that will permit most anglers to create an exact imitation of the insect in question.

The inventor, being in that category of fishermen known as purists, has developed a most unusual and novel concept relating to fly fishing for game fish in the fresh waters to be found throughout civilized countries as we know them today. Essentially, the concept accomplishes two rather distinct objectives, by means of one technique, with variations.

The first objective is termed by the inventor the "Brush-Off" which is a very simple means of avoiding snagging of the lure accomplished by employing a monofilament loop encircling the hook. The second objective is termed by the inventor the "Actions-Fly" which is a means of bringing about erratic fly movement in the water, when properly fished, accomplished by looping the line over one of the monofilament stubs of a manufactured clip provided near the head of the fly, which, when manipulated properly, drags the fly from a point other than the edge of the hook.

Reference is to be had to the accompanying drawing forming a part of this specification, which show a fly mounted on a hook with a monofilament loop surrounding the hook to make it snagproof.

Figure 1:
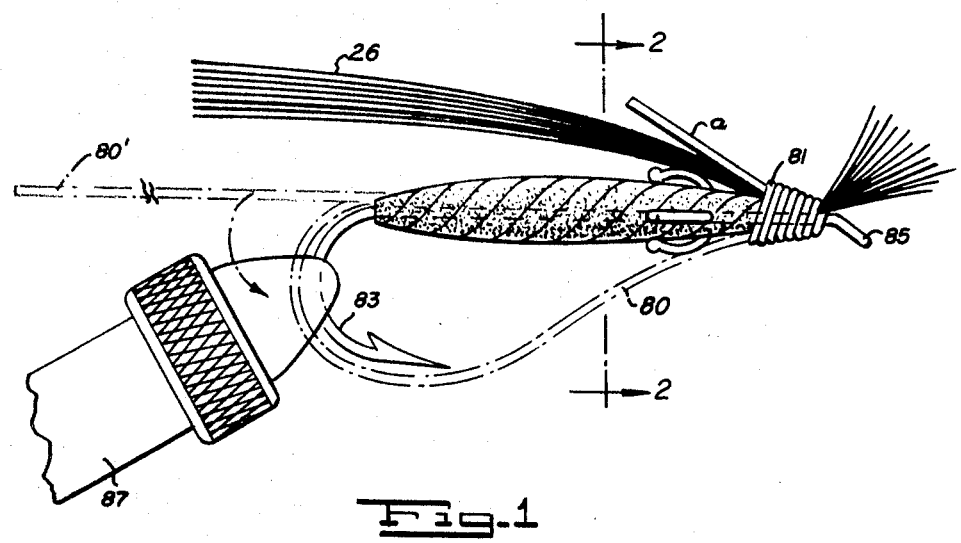
Figure 2:
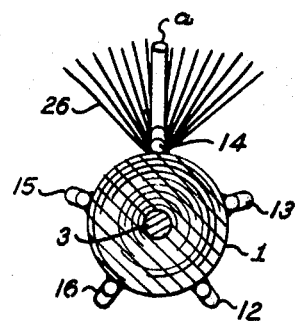

In FIGS. 1 and 2 a fly is shown constructed in accordance with the teachings of my U.S. Pat. No. 3,500,574 issued Mar. 17, 1970. The "Actions-Fly" feature described in more detail in that patent is shown by the top-forward straight clip a which has been bent backward to form the clip, the monofilament a having been bent backward from the monofilament projection from the tail end of the fly body as shown in phantom line position 80$^1$.

"Brush-Off" is the name given by the inventor to the design he has developed to make fishing hooks used with artifical flies, snag and foul resistant. Fish hooks so equipped would have protection against snagging into and becoming fouled or damaged by rocks, limbs, brush, trees, weeds, sea-weed and debris above, on or below the water's surface. Also, it will prevent long bucktail, polar bear hair and hackles used on streamer flies from lodging beneath the hook.

"Brush-Off" is believed to be unique and original in design. The design is obtained when a loop 80 of flexible line or fiber, such as monofilament line or leader, horsehair, etc., is attached to the shank of the fishing hook. This loop is in alignment with the curve of the hook with a portion of the fiber passing in front of the hook's point. The flexible line or fiber 80 will exit and enter on the hook's shank at different points, never at the same place. The position on the shank that the flexible line or fiber will exit and enter can be changed for adapting to different sizes and types of hooks.

The loop of the fiber around the hook curve is the essential feature of the "Brush-Off." As a result, sufficiently light weight or small diameter flexible line or fiber can be used for adaptation to dry, wet nymphs and streamer flies of all sizes. Therefore, there is no significant weight to alter effective flotation of the dry fly, wind resistance to hamper casting, water resistance to alter the action of the underwater flies and it is least visible to the fish. By a combination of altering the size of the loop, and the diameter or weight of the flexible line forming the loop, the "Brush-Off" structure can be adapted to any size or type artificial fly without significantly resisting a fish's strike. The loop is also essential to give "Brush-Off" resiliency to regain its original shape and position time after time. "Brush-Off" will not significantly resist the strike and impair full hooking of the fish when applied correctly to the size and type of fly. Any fly fisherman knows that he has lost fish when he discovered the hook-point had been damaged on a rock; or that he had fished through a lot of fine water with a fouled fry; to say nothing of the time lost in unsnagging or defouling the fly. The structure termed "Brush-Off" is believed to lend a new dimension to fly fishing for all devotees of the art.

In FIG. 1, the monofilament 80 is laid on the top of the shank of the fishhook with portion a bent backward to form a clip. The tying thread 81 is used to secure the monofilament to the top of the shank. During this operation, the beginning of the "Brush-Off" structure is mounted in the tying vise 87.

It is to be noted that the monofilament section 80$^1$ is now passed (in the direction of the arrow) between the vise jaws, bent to conform to the outer periphery of the hook 83 and brought forward and attached to the shank of the hook closely adjacent to the eye 85 of the hook by further wrapping with the tying material 81. To obtain the desired tear-drop "Brush-Off" shape, a pull should be applied to 80 before it is tied into the head of the fly with the tying thread.

In addition to the straight clip a there may be four clips 12, 13, 15 and 16 in the situation where an "Actions-Fly" fly is being manufactured; and five curved clips when a "Brush-Off" fly is being tied; the cross-sectional view of FIG. 2 showing such. The body of the fly 1 about the hook shank 3 envelops the clips at the head end of the fly. The end of the monofilament a comprises a further clip 14 on top of the fly secured in the head of the fly by the tying material 81, along with the end portions of clips 12, 13, 15 and 16.

I claim:

1. A fishing fly comprising a hook having an eye, and a shank bent at one end to terminate in a barbed point, a fly body on the shank between the eye and the barbed point with a head formed near the eye, a flexible monofilament loop having one end extending from the tail end of the fly body and about the outer periphery of the bent shank and barbed point and substantially in the plane of the bent shank, and means holding the other end of said loop in said head of the fly.

* * * * *